United States Patent [19]

McWhorter

[11] Patent Number: 5,205,246
[45] Date of Patent: Apr. 27, 1993

[54] ECONOMY ENGINE

[76] Inventor: Edward M. McWhorter, 6931 Greenbrook Cir., Citrus Heights, Calif. 95621

[21] Appl. No.: 943,555

[22] Filed: Sep. 11, 1992

[51] Int. Cl.⁵ .......................................... F02B 75/32
[52] U.S. Cl. ................... 123/79 R; 123/658; 123/265; 60/304
[58] Field of Search ................ 123/658, 298, 73 C, 123/79 R, 261, 265; 60/304, 312, 314

[56] References Cited

U.S. PATENT DOCUMENTS

| | | | |
|---|---|---|---|
| 4,103,664 | 8/1978 | Iida et al. | 123/265 |
| 4,108,119 | 7/1978 | McWhorter | 123/315 |
| 4,125,105 | 11/1978 | May | 123/265 |
| 4,248,199 | 2/1981 | McWhorter | 123/315 |
| 4,312,313 | 1/1982 | McWhorter | 123/315 |
| 5,134,849 | 8/1992 | McWhorter | 60/304 |
| 5,154,141 | 10/1992 | McWhorter | 123/21 |

Primary Examiner—David A. Okonsky

[57] ABSTRACT

The invention presents new and useful improvements in the mechanical design of control elements used in the sequencing of the exhaust and intake process cycles of the 4-stroke reciprocating piston engine. The exhaust and induction circuits pass through the same valve port and their flows are alternately controlled by the same poppet valve. The camshaft exhaust and intake lobes are combined into a single broad double-cycle lobe such that the poppet valve remains fully open at the end of the exhaust stroke permitting the intake stroke to begin with the poppet valve in the same fully open position without the attendant problem of exhaust gas dilution of the air charge entering the engine, as most generally associated with valve overlap in the conventional sequencing method using two poppet valves.

The simplification of having only one poppet valve, one valve port, and one cam lobe per each engine cylinder reduces the engine manufacturing cost. The ability to complete the exhaust stroke and begin the intake stroke with the poppet valve in the fully open position increases the systems volumetric efficiency and reduces the pumping work, thus improving the engines specific fuel consumption.

6 Claims, 7 Drawing Sheets

ECONOMY ENGINE

CROSS REFERENCES

The present invention employs basic exhaust gas ejector design from my earlier U.S. Pat. Nos. 4108119, 4248199, 4312313, 5134849 and my copending Pat. Ser. Nos. 794938 and 916394.

BACKGROUND OF THE INVENTION

1. Field of the Invention

The present invention relates to valve operating mechanism for internal combustion engines which employ the proprietary features of exhaust gas ejectors listed in the cross references.

2. Description of Prior Art

The conventional 4-stroke internal combustion engine uses individual valves to control the flow within the induction and exhaust circuits. The period of operation of each valve in their respective circuits slightly overlap when the engine piston is at the top dead center position of crank rotation, near the end of the exhaust stroke, such that the intake valve begins to open before the exhaust valve has fully closed and the exhust valve is allowed to remain open such that it does not fully close until the piston has passed its top dead center position. Overlapping the period of valve operation improves performance in the conventional engine, particularly in the high sped range where stream inertia becomes more important in the sequencing and separation of events in each circuit. When conventional valving is used in the upper cylinder in conjunction with a lower cylinder side-port ejector the early evacuation of exhaust gases and the induction of air through the ejector, at the bottom of the engine cycle, reduce the inertia of both the exhaust and intake streams flowing in their respective upper cylinder valve port circuits making high speed engine control difficult, when valve overlap is present and standard carburetion techniques are employed. The use of the lower cylinder ejector under these conditions result in the loss of fuel into the exhaust stream and also in exhaust gas dilution of the incoming air-fuel charge which cause manifold burning and backfires as well as the loss of engine speed control. Higher engine temperatures are also experienced because of the lean fuel mixture resulting from the loss of fuel into the exhaust stream and also because of the additional air taken in through the lower cylinder ejector.

In the present invention these problems are eliminated by operating the exhaust gas ejector through an upper cylinder exhaust port such that only one poppet valve per each cylinder is required making the discussion of valve overlap mute. The upper cylinder ejector is designed to function in conjunction with direct or indirect fuel injector systems in place of carburetion. In this respect, some type of engines, such as the dual-cycle systems which are capable of 2-stroke and 4-stroke operation, or dual-fuel engines which use both light and heavy fuels, it is desirable to use both types of fuel injection which increases the versatility of the present invention. In other systems which run at high speeds it is desirable to employ exhaust gas ejectors at both the upper and lower cylinder positions.

In the present invention a combination of engine designs are possible considering direct and indirect fuel injection and by employing an upper cylinder gas ejector singularly or in combination with a lower cylinder gas ejector of which there are several types as described in the cross references.

Most importantly, in the present invention the problem of valve overlap is completely overcome by combining the exhaust and intake lobes of the camshaft into a single broad double-cycle lobe such that the poppet valve is lifted from its seat only once to complete both the exhaust and intake stroke with one single actuation. The double-cycle cam lobe opens the upper cylinder poppet valve at the beginning of the exhaust stroke and it remains fully open throughout the remaining portion of the exhaust stroke such that it is in the fully open position when the intake stroke begins and does not close until the intake stroke is complete. Operating the poppet valve in this manner increases the engines volumetric efficiency and decreases the pressure loads acting on the piston during the exhaust and induction strokes thus reducing the amount of pumping work performed.

Separation of the exhaust and induction streams within the single valve port during the flow reversal when the piston passes the top-dead-center is accomplished by the initial flow dynamics within the gas ejector nozzle and diffuser circuits preventing reversion and subsequent exhaust gas dilution of the air charge.

SUMMARY OF THE INVENTION

The present invention is an internal combustion engine having a novel camshaft comprising a double-cycle cam lobe which controls both the intake and exhaust gas flow respectively to and from the engine cylinder through the same valve port using a single poppet valve. This type of operation is made possible by the use of exhaust gas ejectors which separate the exhaust and induction flows. The objectives of the invention are:

a. To provide an engine of superior performance having a minimum number of precision machined working parts.

b. To reduce the manufacturing cost of the engine by decreasing the number of moving parts in its construction.

c. To provide an engine having the highest possible volumetric efficiency and requiring the least amount of pumping work by permitting the cylinder control valve to remain fully open at the end of the exhaust stroke such that the valve is fully open when the intake stroke begins.

d. To provide an engine having a smaller envelope and a lower weight per unit of piston displacement.

All of the forgoing and still further objects and advantages of the invention will become apparent from a consideration of the drawings and ensuing detailed description.

DESCRIPTION OF THE PREFERRED EMBODIMENT

Figure 1:
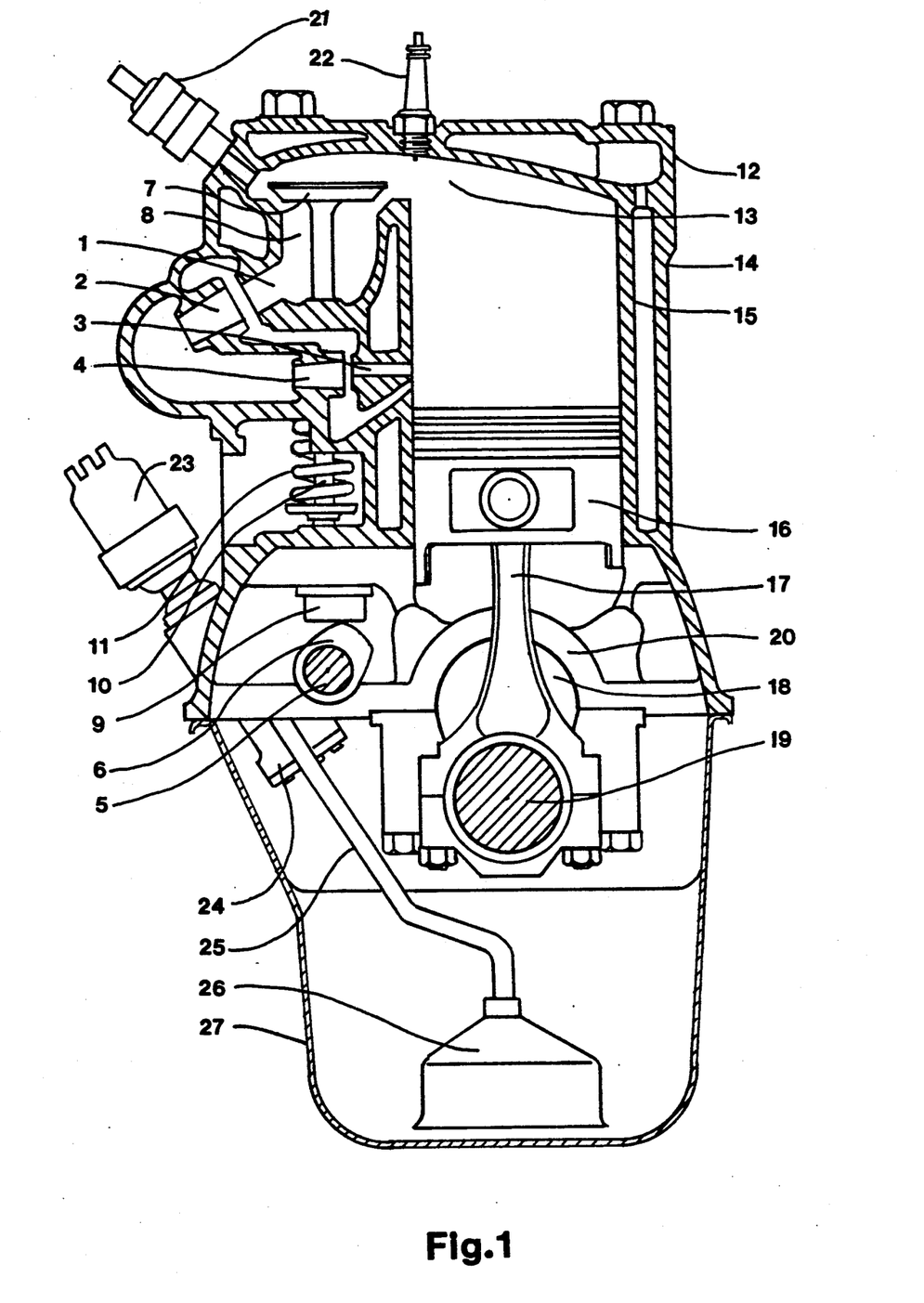
FIG. 1 is a diagrammatic cross-section of the engine horizontally elongated to show in a single view the relative placement of the working elements of the primary embodiment of the present invention.

Referring now to the drawings and to FIG. 1 thereof in particular which is a horizontally elongated schematic showing the basic features of the primary engine. Nozzle 1 and its associated diffuser 2 comprising the upper cylinder ejector refer to those proprietary features of U.S. Pat. No. 4,248,199 and U.S. Pat. (Ser. No. 07/794,938). Nozzle 3 and its associated diffuser 4 comprise the lower cylinder ejector which refer to those proprietary features of U.S. Pat. No. 4,312,313 and U.S. Pat. No. 5,134,849. These cross referenced patents provide the exclusive flow facility within the engine manifolding making possible the unique engine processes and novel design of the present invention. Other features of the engine and its unique manner of operation broadly encompass the proprietary nature of the remaining cross referenced patents.

The novel feature of the engine presented as FIG. 1 is camshaft 5 holding double-cycle cam lobe 6. The engine uses only one poppet valve per each engine cylinder, therefore poppet valve 7 controls both the exhaust and intake flows through the single valve port 8. Poppet valve 7 is actuated only once for each complete engine cycle comprising four strokes of the engine piston.

Other elements of the engine presented in FIG. 1 which describe its incidental means of operation are cylinder head 12 containing combustion chamber 13 which is fixedly mounted upon engine block 14 containing cylinder 15. Engine piston 16 is slidably mounted within cylinder 15. Connecting rod 17 is pivotally attached to piston 6 at the upper end and rotatively mounted upon crankpin 19 of crankshaft 18 at the lower end such that the rotation of crankshaft 18 within main journal 20 of engine block 14 causes piston 16 to reciprocate within cylinder 15. Cylinder 15, piston 16, connecting rod 17 and crankshaft 18 constitute the elements of a four-bar reciprocating linkage, which in this application is the mechanism chosen to describe the means of displacing the working fluid within the swept volume of cylinder 15. It will be recognized by those skilled in the art that other means of producing a reciprocating motion of piston 16 may be used to the same advantage without loss or change of novelty thereby demonstrating the diversity of the present engine. Camshaft 5 is connected to crankshaft 18 by the conventional 2 to 1 gearing such that each two complete rotations of crankshaft 18 produces one complete rotation of camshaft 5. When camshaft 5 is rotated it causes cam lobe 6 to bear upon valve lifter 9 which in turn bears upon valve stem 10 and compresses valve spring 11 causing poppet valve 7 to be raised from its seat. Poppet valve 7 is opened at the beginning of the exhaust process and remains fully open throughout the cycle such that it is fully open at the beginning of the intake process and closes only when that process is completed. Operation of poppet valve 7 in this manner constitutes the primary unique feature of the engine process of the present invention.

The preferred method of igniting fuel injected into combustion chamber 13 by fuel injector 21, is by high tension electrical charge delivered to spark plug 22 from distributor 23 which works by synchronized gearing off of camshaft 5 as does lubrication pump 24 which receives oil through pipe 25 from strainer 26 submerged in the reservoir of oil pan 27. These latter features of the engine are pertinent to the uniqueness of the design only in so far as they indicate the ability of the engine to operate in the two-stroke mode utilizing the so called wet-sump method of lubrication negating the necessity of mixing the lubrication oil with the fuel and the use of expensive roller or ball bearings in the crankshaft design in place of the more durable sleeve bearings.

Figure 2:
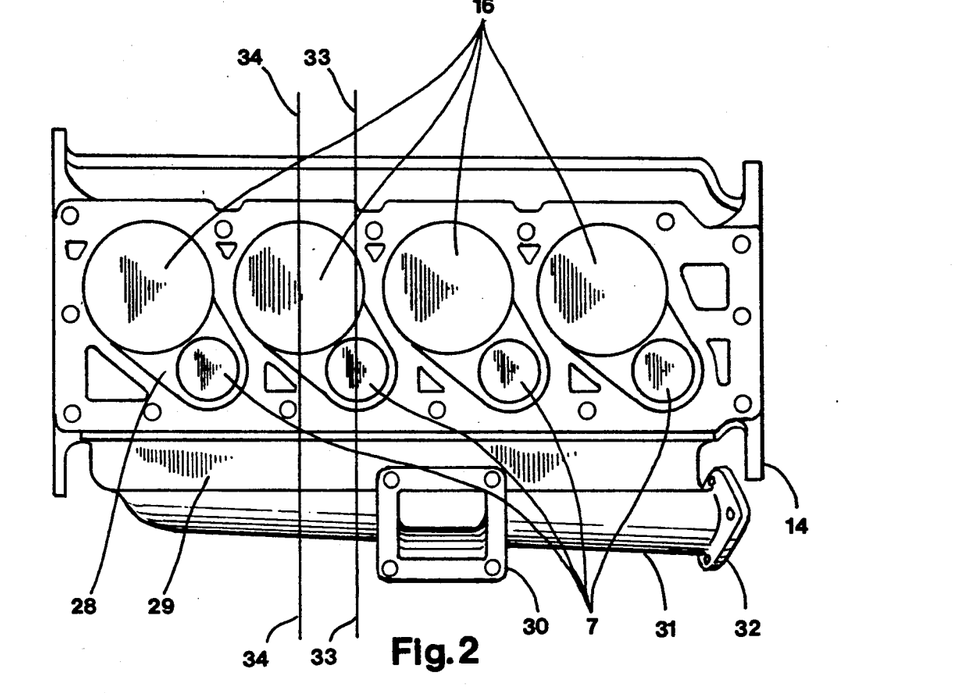
FIG. 2 is a top view of the engine with the cylinder head removed to show the relative positions of the engine pistons and valves within the engine block adjacent to the engine manifolding and also indicates the points at which cross-sections of the engine are to be taken.

Referring now to FIG. 2 which is a top view of the engine with the cylinder head removed in order to show the relative placement of poppet valves 7 and pistons 16 within an engine having a plurality of cylinders. Typically at each cylinder a passage way 28, which is located below the combustion chamber 13 of head 12 shown in FIG. 1, is set to one side of the axial center of engine cylinder 15 in order to impart a swirling motion to the air-fuel mixture entering cylinder 15. Also shown in FIG. 2, mounted on block 14, is the air intake manifold termed air chest 29 containing inlet flange 30 and exhaust manifold 31 containing exhaust flange 32. Line 33—33 is a section-line designating the point of cross-sectioning through valve port 8, of which a portion of this section is broken out and presented as FIG. 3.

Figure 3:
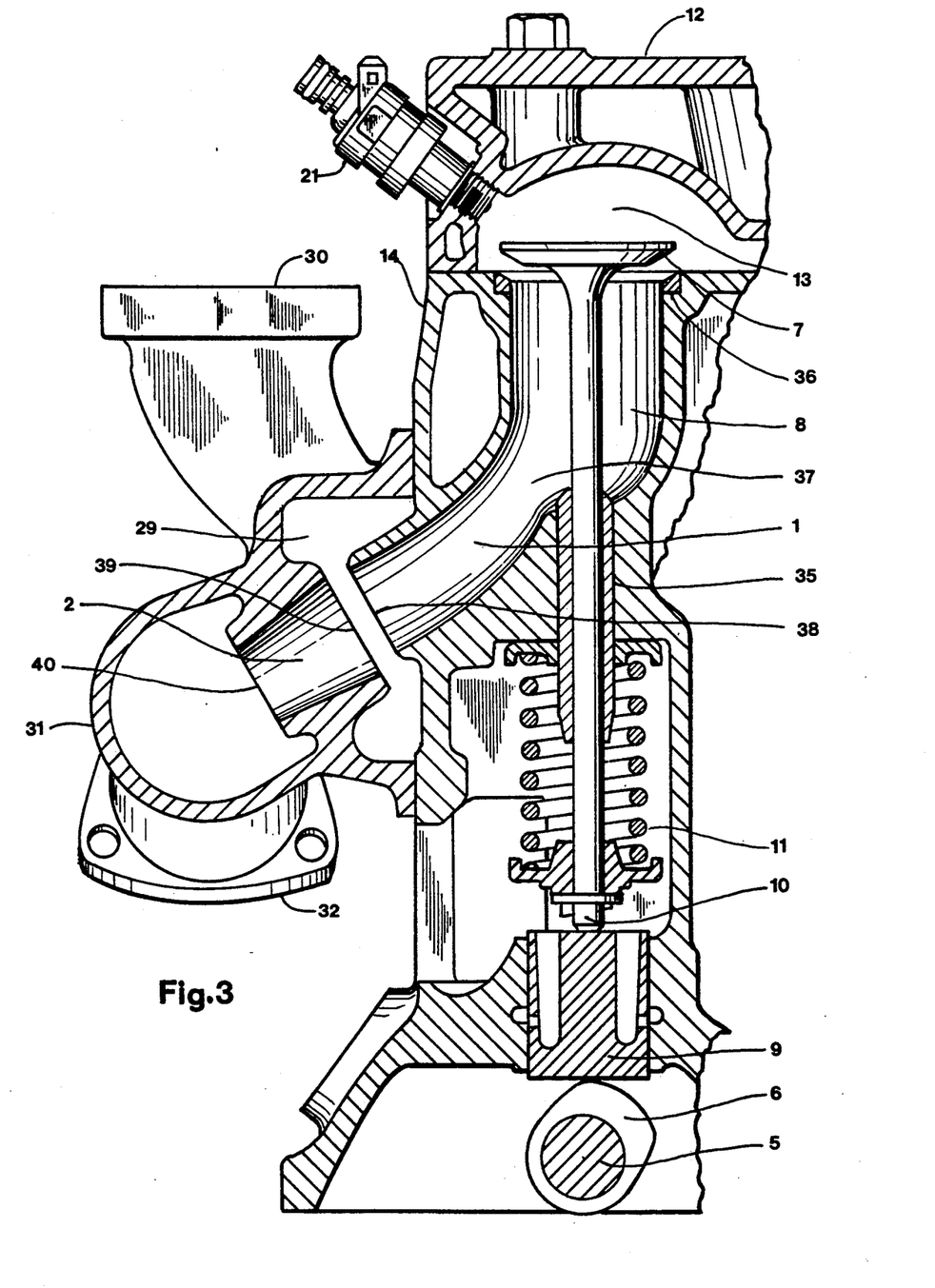
FIG. 3 is a portion of the cross-section of the engine taken through the valve port in accordance with the arrangement and embodiment of FIG. 2.

Referring now to FIG. 3 which is a cross-sectional portion of the engine valve port 8 showing the relevant features of the valve actuating and the corresponding flow channels within the valve port and the ejector and its manifolding.

In FIG. 3 the couble-cycle cam lobe 6 of camshaft 5, which rotates in a counter-clockwise direction, has engaged valve lifter 9 at the beginning of the exhaust cycle and has raised it to its full height. Valve lifter 9 pushing against valve stem 10 has compressed valve spring 11 causing valve stem 10 to move upward through valve guide 35 raising poppet valve 7 off of valve seat 36 bringing combustion chamber 13 into communication with valve port 8. Combustion gases flow from combustion chamber 13 past the annular open area between poppet valve 7 and valve seat 36 and enter valve port 8. For greater efficiency it is desirable to form a slight throat constriction at the inlet 37 of ejector nozzle 1 such that at the beginning of exhaust blowdown a critical pressure difference is initially created across this point relative to the pressures downstream within nozzle 1. Designing the ejector nozzle 1 in this manner creates an initial sonic velocity at exit 38 of nozzle 1. The throat constriction at inlet 37 of ejector nozzle 1 is only slightly smaller than the cross-sectional area of valve port 8 and is designed to improve the pumping efficiency of the exhaust ejector system. The omission of throat constriction 37 from the design does not invalidate the novelty of the cross referenced applications.

The high velocity exhaust gases streaming from ejector nozzle 1 exit 38 impact the air of air chest 29 within the intervening space between nozzle 1 exit 38 and the inlet 39 of ejector diffuser 2. The momentum exchange during the impact of the exhaust molecules with the air molecules within the intervening space between nozzle exit 38 and diffuser inlet 39 entrains air from air chest 29 and carries it into diffuser 2. As the air and exhaust gas mixture enter the convergency of diffuser 2 it is compressed and its velocity decreases causing the pressure at the diffuser exit 40 to rise above that within the exhaust manifold 31. The compression at diffuser exit 40, together with the stream momentum, imparts an impetus to the gaseous mixture causing it to flow into exhaust manifold 31.

The exhaust gas ejector comprising nozzle 1 and diffuser 2 is a fluid pump in which the suction side of the pump is air chest 29 and the discharge side is the exhaust manifold 31. The compressible flow in the conventional type of ejector system is continuous and unidirectional, but in the exhaust gas ejector of FIG. 3 the flow is intermittent, and in nozzle 1 its flow is bidirectional, pulsing harmonically in a manner corresponding sequentially to the exhaust and intake engine cycles. This does not pose a problem in the super charged system where the pressure in air chest 29 is always maintained at a slightly higher level than that in exhaust manifold 31. However, in the unblown system the problem of exhaust gas reversion across diffuser 2 must be prevented by maintaining the positive exhaust stream inertia by angling the ejector flow axis such that it intercepts the flow axis of the exhaust manifold diagonally reducing turning losses. Turning losses are further reduced by forming an anti-reversion step and a turning lip at the exit of diffuser 2 as shown in cross referenced U.S. Pat. No. 4,248,199. When exhaust manifold 31 is designed as a constantly accelerating channel, drafting by the upstream flow past the diffuser lip draws air through the diffuser in a positive direction.

Figure 4:
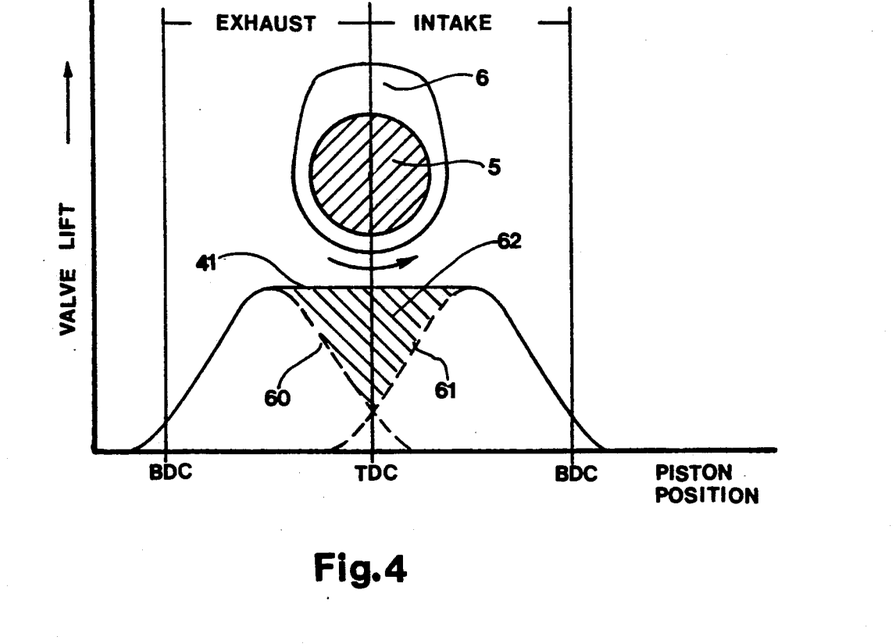
FIG. 4 is a diagram of the valve lift relative to the piston positions at top and bottom dead centers of crank rotation during the exhaust and intake strokes of the piston.

Turning now to FIG. 4 which is a diagram illustrating the relative operation of camshaft 5 with respect to valve lift and the corresponding ending piston positions at bottom dead center (BDC) and top dead center (TDC) of crankshaft rotation. Also shown in FIG. 4 is camshaft 5 with double-cycle cam lobe 6. Camshaft 5 is centered upon the TDC line such that the TDC line passes through the center of the double-cycle cam lobe 6 dividing the exhaust side of the cam lobe 6 from the intake side. When camshaft 5 is rotated counter-clockwise the exhaust side of the cam lobe 6 is the first to engage the valve lifter 9 at BDC and begins to lift poppet valve 7 from its seat as previously shown in FIG. 3. As camshaft 5 continues its rotation poppet valve 7 is lifted to its full height and remains in that position to the end of the exhaust stroke at TDC as depicted by valve lift trace line 41. In FIG. 4 it can be seen from valve lift trace line 41 that the intake stroke begins at TDC with the poppet valve 7 fully open. Having poppet valve 7 fully open at the end of the exhaust stroke decreases the compressive negative pumping work during the exhaust stroke. Starting the induction stroke with poppet valve 7 fully open greatly increases the engines volumetric efficiency and reduces the vacuum load above the engine piston during its downward intake stroke again reducing the pumping load. In the conventional engine where there are separate valves controlling the exhaust and intake flows the exhaust valve must first be closed as shown in the broken valve trace line 60 before the intake valve is opened as shown by valve trace line 61. In FIG. 4 it can be seen that typically a slight overlap occurs at TDC between the two valve trace lines 60 and 61 in the conventional engine system which employ separate valving for controlling the exhaust and intake flows. The cross-hatched area bounded by lines 41, 60 and 61 designated as area 62 represents the increased valve flow are available in the use of the double-cycle cam lobe 6 relative to that of separate cams and valves for each process stroke. The area 62 relates proportionately to the improvement of the engine volumetric efficiency and to the amount of reduced pump work.

Figure 5:
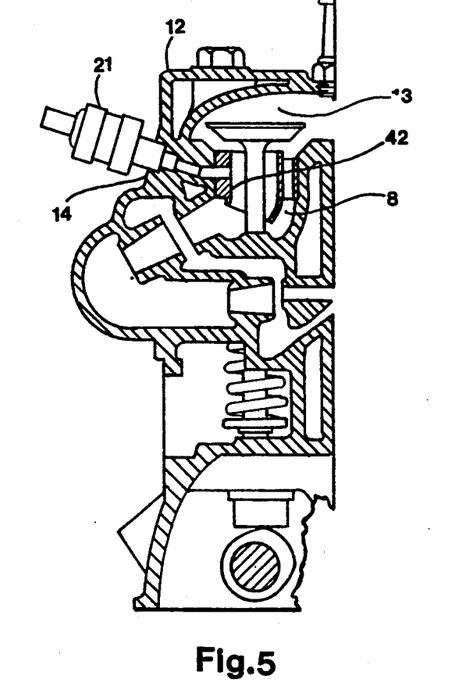
FIG. 5 is a portion of the diagrammatic cross-section of the embodiments of FIG. 1 showing a different location of fuel injection and a modification of the valve port shown in the embodiment of FIG. 1.

Turning now to FIG. 5 which is a horizontally elongated diagram of the engine manifolding showing a different location of fuel injector 21. In FIGS. 1 and 3 the fuel injector 21 was shown as mounted in head 12 and the fuel was directly injected into combustion chamber 13. In FIG. 5 the fuel injector 21 is shown mounted in engine block 14 and the fuel is indirectly injected into valve port 8. In order to facilitate the indirect injection, an injection cup 42 is inserted into valve port 8 to catch the injected fuel and facilitate its evaporation, transport, and mixture within the air charge during the intake stroke. Details of the injection cup are shown in FIG. 6.

Figure 6:
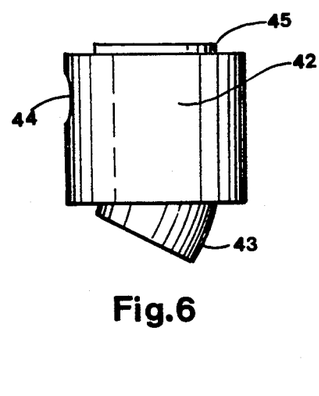
FIG. 6 is a side view of a fuel injection cup used in the modification of the valve port as shown in the embodiment of FIG. 5.

Referring now to FIG. 6 which is a side view of injection cup 42 showing its external features comprising deflector 43, injection port 44 and lip 45.

Figure 7:
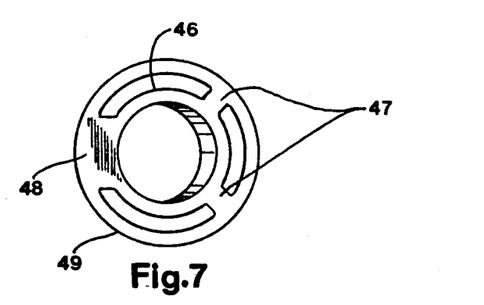
FIG. 7 is a top view of the fuel injection cup of FIG. 6 showing part of its interior embodiments in accordance with the present invention.

FIG. 7 is the top view of injection cup 42 shown in FIG. 6. The interior features of injection cup 42 in the top view are inner cylinder 46, webs 47, thickened web 48 and outer cylinder 49.

Figure 8:
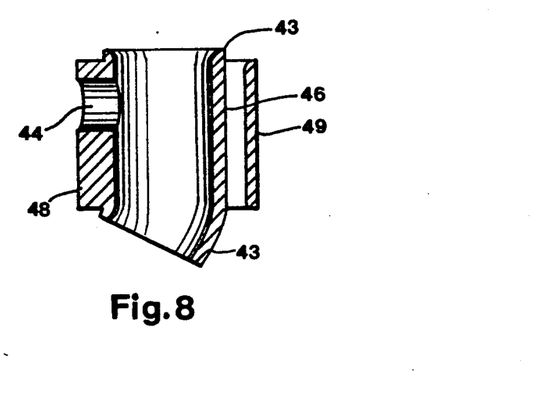
FIG. 8 is a section view of the fuel injection cup having the embodiments of FIG. 6 and FIG. 7.

A cross-section of the injection cup 42 cut longitudinally through the injection port 44 showing the various elements comprising its construction is presented as FIG. 8. Because of its irregular shape and because it is made of steel the preferred method of the manufacture of the injection cup 42 is by precision investment casting requiring a minimum of cleanup and machining of the outer surfaces of outer cylinder 49. The general shape of injection cup 42 can be changed to conform with size and form of the particular engine system without effecting its primary function a stated above.

Figure 9:
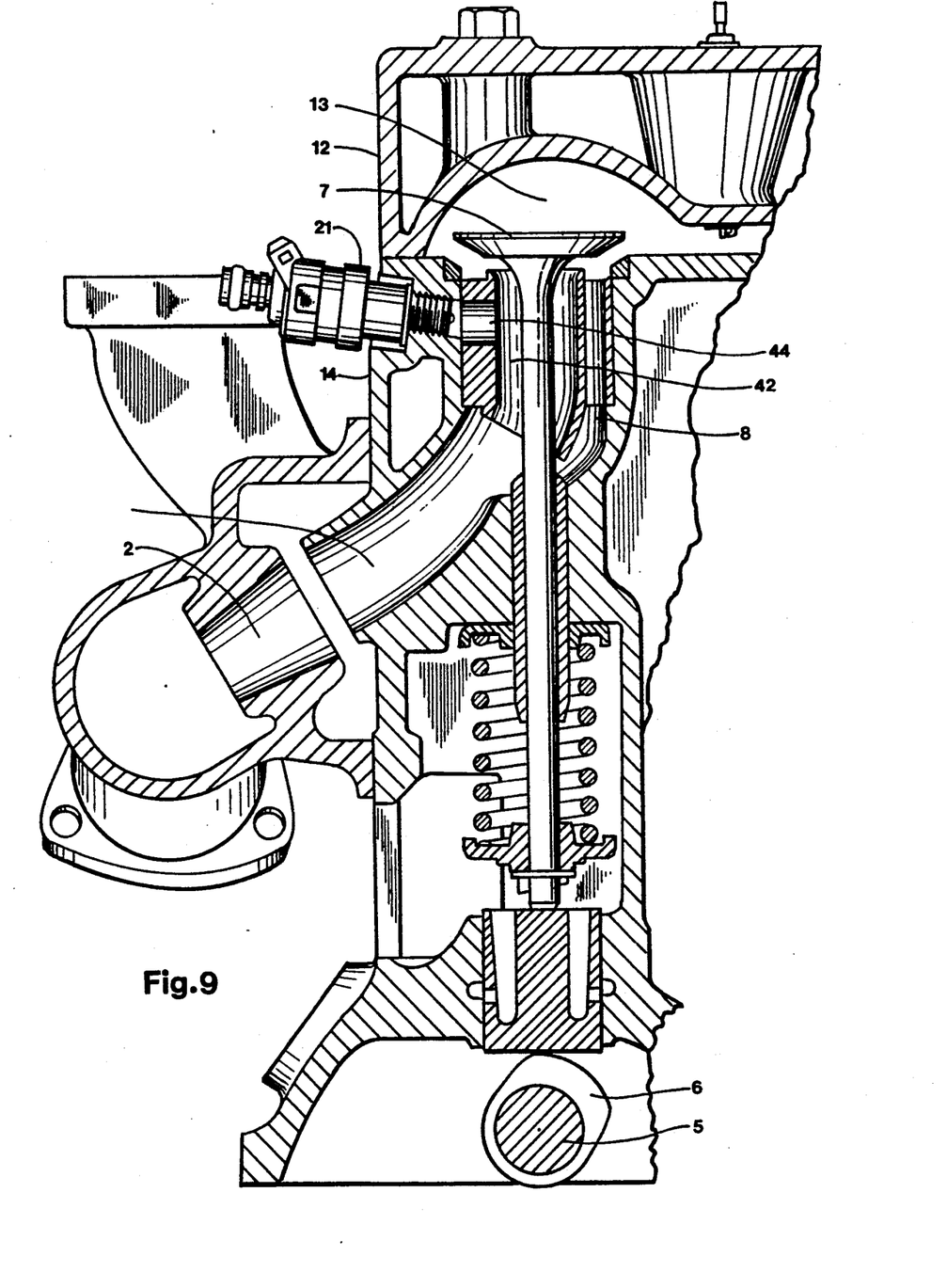
FIG. 9 is a cross-section of the engine taken through the valve port in accordance with the embodiments of FIG. 2 and illustrating the manner of fuel injection in accordance with the embodiments of FIG. 5 and the embodiments of the fuel injection cup of FIGS. 6, 7 and 8.

Referring now to FIG. 9 which is a portion of the engine cross-section presented as section line 33—33 as shown in FIG. 2. This is the same cross-section as shown in FIG. 3 cutting through valve port 8. In FIG. 9 the fuel injector 21 is shown mounted in engine block 14 instead of engine head 12 and it injects fuel into injection port 44 of injection cup 42 which is press fit into valve port 8 where as in FIG. 3 the fuel was injected into combustion chamber 13. The operation of camshaft 5 and double cycle cam lobe 6 in FIG. 9 proceeds in the same manner as that previously described and shown in the diagram of FIG. 4. Likewise, in a similar manner the flow through the upper cylinder ejector nozzle 1 and diffuser 2 proceed in the same manner as that given in the description of the operation of the system shown in FIG. 3.

Figure 10:
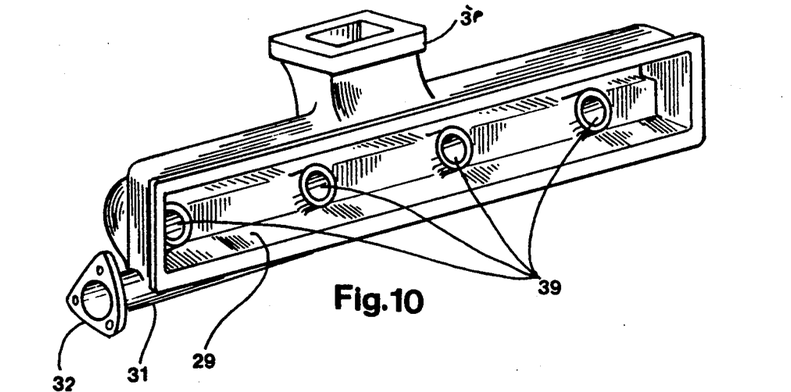
FIG. 10 is a perspective view of the engine manifold to be used exclusively with the embodiments of the engines of FIGS. 3 and 9.

In FIGS. 3 and 9 only the upper cylinder ejector comprising nozzle 1 and diffuser 2 is shown. When only the upper cylinder ejector is used the ejector manifold contains only one ejector diffuser per each cylinder as shown in the perspective view of the manifolding presented as FIG. 10. In FIG. 10 the diffuser inlets 39 are shown within the open cavity of air chest 29. The manifolding of FIG. 10 comprises the ejector diffusers 2, air chest 29, inlet flange 30, exhaust manifold 31 and exhaust flange 32.

The engine head 12 of FIG. 9 may be replaced with engine head 12 of FIG. 3 which contains fuel injector 21. This combination then provides an engine having two fuel injectors 21, one for indirect fuel injection into valve port 8 and the other for direct injection into combustion chamber 13. Having two points of fuel injection increases the number of options available in the engine design relative to its intended duty cycle.

Figure 11:
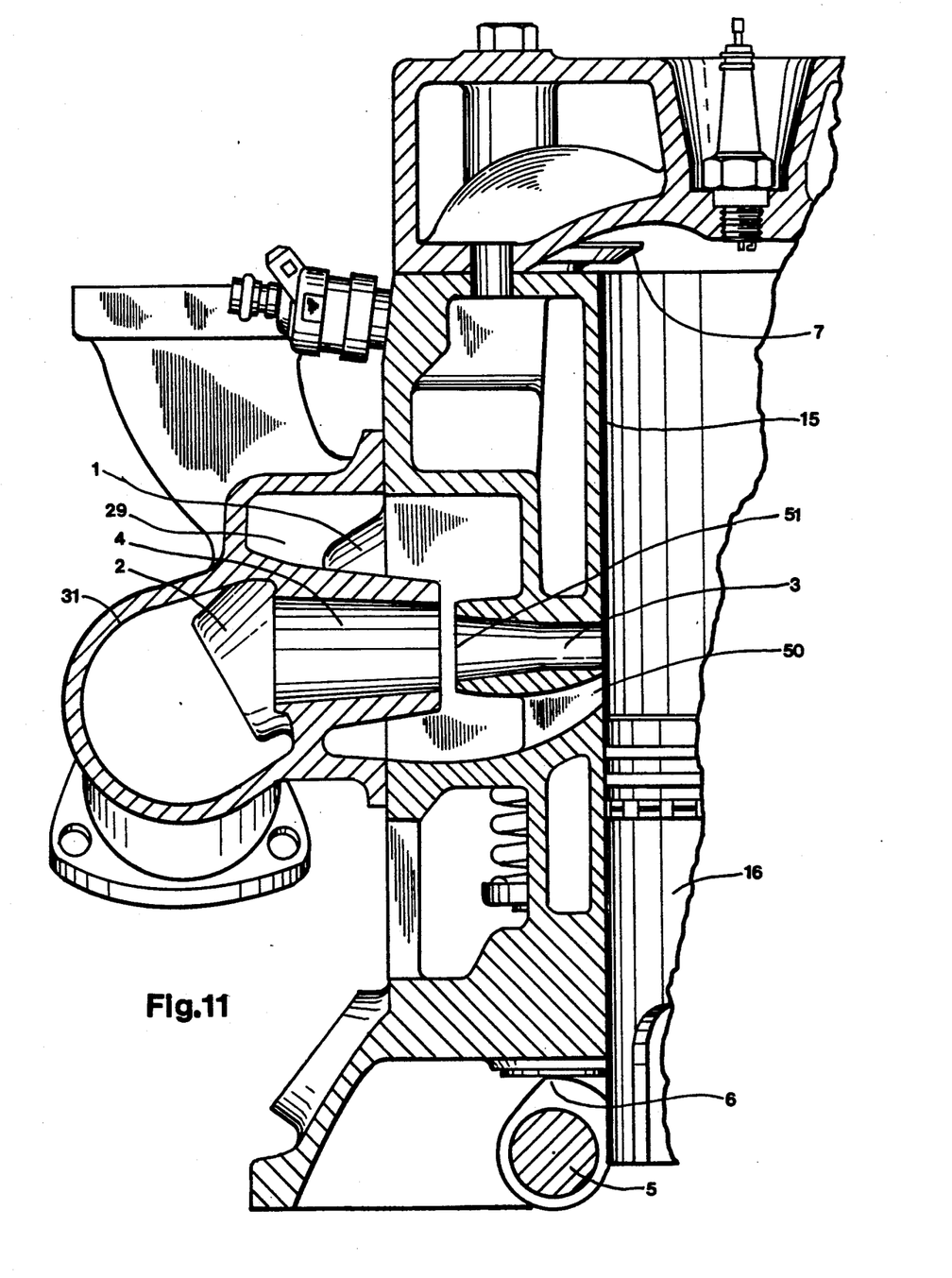
FIG. 11 is a cross-section of the engine taken through the engine cylinder in accordance with the embodiments of FIG. 2 and shows the principal parts of the lower cylinder exhaust gas ejector and their relative positions to that of the upper cylinder ejector.

Referring now to FIG. 11 which is a portion of the engine sectioned through the center of engine cylinder 15 along section line 34—34 of FIG. 2.

Figure 12:
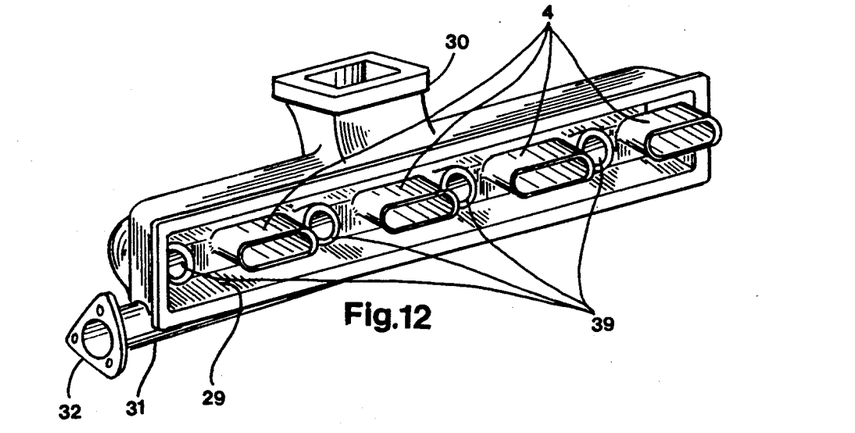
FIG. 12 is a perspective view of the engine manifold to be used with the embodiments of the engine of FIG. 3 or FIG. 9 when these systems are used in combination with the embodiments of FIG. 11.

FIG. 11 shows the lower cylinder side-port injector comprising a plurality of nozzles 3 and a single diffuser 4. The lower cylinder ejector uses the same manifolding as the upper cylinder ejector of which nozzle 1 and diffuser 2 can be seen in the background. However, because the lower cylinder ejector uses a plurality of nozzles 3, arranged horizontally along the cylinder 15 wall, the diffuser 4 has an elongated inlet 39 in order to accommodate the plurality of individual flows as taught in the cross referenced U.S. Pat. No. 5,134,849. FIG. 12 shows the ejector manifolding, which has the same dimensions as that of FIG. 10, but which also accommodates the elongated diffuser 4 of the lower cylinder ejector. FIG. 12 shows the relative placement of elongated diffuser 4 adjacent to the inlet 39 of diffuser 2 of the upper cylinder ejector. Other elements of the ejector manifold of FIG. 12 remain the same as those of FIG. 10 and are shown for comparison.

Returning now to FIG. 11 and a description of its operation. When piston 16 is near its bottom dead center (BDC) position of crankshaft 18 rotation approaching the end of the exhaust stroke, ejector nozzles 3 are uncovered and are brought into communication with the volume of cylinder 15 allowing exhaust gas to flow from cylinder 15 through nozzles 3 and its inertia carries it into diffuser 4 where its velocity is decreased in the transitional convergence from the elongated inlet to its near circular exit where it is compressed by the stream inertia and ejected into exhaust manifold 31. At the same time poppet valve 7 is also opened and exhaust gases flow from cylinder 15 into nozzle 1 and its inertia carries it into diffuser 3 where it is compressed and also ejected into exhaust manifold 31. As piston 16 descends further in cylinder 15 to its bottom dead center (BDC) position of crankshaft 18 rotation it uncovers side-ports 50 as the exhaust process enters the negative pressure phase. Scavenging air is taken into cylinder 15 through side-ports 50 as well as through ejector nozzles 3 and poppet valve 7.

Side-ports 50, which are positioned on each side of diffuser 4 and are not an integral part of the ejector system but are presented here as an optional feature of the synergistic flow within air chest 29. Side-ports 50 are a proprietary element of cross referenced U.S. Pat. No. 4,312,313. Side-ports 50 are used in small high speed dual-cycle engines. Larger engines would employ only the obliquely parallel nozzles 3 similar to those of cross referenced Pat. No. 5,134,849 which are intended to impart a swirling motion to the charge as its enters cylinder 15 which is in the same rotational direction as the air-fuel charge taken in through passage way 28, thus minimizing the mixing of the two streams such that the upper and lower charges remain stratified.

Figure 13:
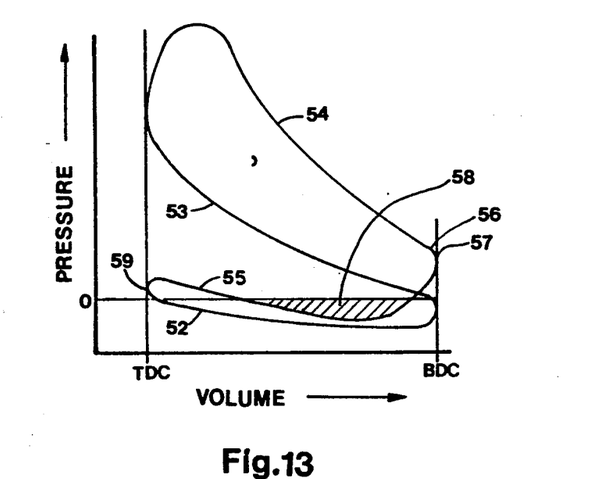
FIG. 13 is an indicator diagram of the general relationship of pressure and volume of a four-stroke engine.

Turning now to FIG. 13. When the intake stroke 52 is complete poppet valve 7 closes and piston 16 begins its upward compression stroke 53. When piston 16 nears the top dead center position of its travel within cylinder 15 at the end of compression stroke 53 ignition and combustion occurs and the power stroke 54 begins, (assuming theoretical constant volume combustion).

Although the total air and air-fuel charge taken into cylinder 15 from the lower and upper points of induction respectively approaches the lean limit of combustion the stratification of the air charge of the lower cylinder 15 allows the combustion of the air-fuel charge taken in at the upper cylinder to proceed in the fuel rich regime. This decreases the flame temperature and the rapid radiation heat transfer into the lower stratified air charge keep the formation of nitrogen oxide emissions low. The combustion gases in the combustion chamber and heated air strata below comprise the working fluid within cylinder 15 acting upon piston 16 during the power stroke 54.

As piston 16 nears the bottom dead center (BDC) of its travel within cylinder 15 at a point near the end of the power stroke 54 it uncovers the lower cylinder ejector nozzle 3 and simultaneously poppet valve 7 is opened by the double-cycle cam lobe 6 of camshaft 5 at point 56 and the positive pressure phase of the blowdown begins. The rapid inertial dynamics of the expanding gaseous system within cylinder 15, and the continual drop of piston 16 within cylinder 15, result in a negative pressure phase, shown as the shaded area 58, of the exhaust stroke 55 which begins at point 57.

During the negative pressure phase 58 of the exhaust stroke 55 scavenge air form air chest 29 is drawn into cylinder 15 through nozzles 3 and side ports 50 as well as open poppet valve 7 and this air is subsequently pushed from cylinder 15 through open poppet valve 7 by piston 16 as it approaches its top dead center (TDC) position of travel within cylinder 15. Because the double-cycle cam lobe 6 of camshaft 5 holds the poppet valve 7 fully open at the end of the exhaust stroke 55 designated as point 59, the pumping work during the exhaust stroke 55 is low.

At the beginning of intake stroke 52 poppet valve 7 is fully open since it was not closed at the end of the exhaust stroke 55 as previously shown in the diagram of FIG. 4. Having poppet valve 7 fully open at the beginning of the intake stroke 52 greatly improves the volumetric efficiency by allowing the air-fuel charge to be freely drawn into cylinder 15 by piston 16. Having poppet valve 7 open at the beginning of the induction stroke also reduces the low pressure negative pumping work of the piston 16. Any vacuum remaining in cylinder 15 is quickly filled by air taken into cylinder 15 through the nozzle 3 and side-ports 50 which improve the overall efficiency of the engine by increasing its air consumption rate.

The novelty of the present invention is therefore seen to be camshaft 5 which combines the exhaust lobe with the intake lobe to form double-cycle cam lobe 6 which actuates poppet valve 7 at half the cyclic frequency of conventional systems requiring the individual control of both the exhaust and intake flows. This simplification represents new and useful improvements in the exclusive use of those proprietary exhaust gas ejector systems listed in the cross references.

What is claimed is:

1. An internal combustion reciprocating piston engine comprising a cylinder head fixedly mounted on an engine block, said cylinder head having a plurality of aligned and evenly spaced combustion chambers, fuel injectors mounted on said cylinder head to inject fuel into said combustion chambers, each said combustion chamber having a passageway leading to a respective cylinder of said engine block, a piston slidably mounted in each said cylinder and caused to reciprocate in accordance with the engine cycle by a reciprocating means, said engine block having a valve port below each said combustion chamber, a poppet valve slidably mounted in said engine block to control the flow through said valve port, a camshaft rotatively mounted in said engine block for actuating said poppet valves in said valve ports, said camshaft having double-cycle cam lobes opening said valve port at the beginning of the exhaust stroke of said piston bringing said combustion chamber into communication with said valve port, said valve port in communication with a nozzle of an ejector, the exit of said nozzle in communication with an air chest, a diffuser inlet of said ejector opposite the nozzle exit, said diffuser inlet also in communication with said air chest and the exit of said diffuser is in communication with an exhaust manifold, said double-cycle cam of said camshaft allowing said poppet valve to close at the end of the intake stroke of said piston.

2. The engine as set forth in claim 1 wherein said engine comprises a second ejector for each said cylinder, said second ejector having a nozzle fixedly mounted on said cylinder, the volume of said cylinder brought into communication with said nozzle of said second ejector when the reciprocation of said piston in said cylinder uncovers said nozzle of said second ejector at a point corresponding to the time when the double-cycle cam lobe begins to open said poppet valve, the exit of said nozzle of said second ejector also in communication with said air chest, a diffuser opposite the nozzle of said second ejector, said diffuser of said second ejector in communication with said air chest at one end and in communication with the said exhaust manifold at the other end.

3. An internal combustion reciprocating piston engine comprising a cylinder head fixedly mounted on an engine block, said cylinder head having a plurality of aligned and evenly spaced combustion chambers, each said combustion chamber having a passageway leading to a respective cylinder mounted in said engine block, a piston slidably mounted in each said cylinder and caused to reciprocate in accordance with the engine cycle by a reciprocating linkage, said engine block having a valve port below each said combustion chamber, a fuel injector mounted in said engine block to inject fuel into an injection cup fixedly mounted in each said valve port, said injection cup comprising an outer cylinder and an inner cylinder, webs between said inner and outer cylinder, a lip on the inner cylinder at an upper end and a deflector at a lower end, a thickened web having an injection port in communication with the inner volume of the inner cylinder, a poppet valve slidably mounted in said engine block to control the flow through said valve port, a camshaft rotatively mounted in said engine block for actuating said poppet valves in said valve ports, said camshaft having double-cycle cam lobes opening said poppet valve in said valve port at the beginning of the exhaust stroke of said piston bringing said combustion chamber into communication with said valve port, said valve port in communication with a nozzle of an ejector, the exit of said nozzle in communication with an air chest, a diffuser inlet of said ejector opposite the nozzle exit, said diffuser inlet also in communication with said air chest and the exit of said diffuser is in communication with an exhaust manifold, said double-cycle cam lobe of said camshaft allowing said poppet valve to close at the end of the intake stroke of said piston.

4. The engine as set forth in claim 3 wherein said engine comprises a second ejector for each said cylinder, said second ejector having a nozzle fixedly mounted on said cylinder, the volume of said cylinder brought into communication with said nozzle of said second ejector when the reciprocation of said piston in said cylinder uncovers said nozzle of said second ejector at a point corresponding to the time when the double-cycle cam lobe begins to open said poppet valve, the exit of said nozzle of said second ejector also in communication with said air chest, a diffuser of said second ejector opposite the nozzle of said second ejector, said diffuser of said second ejector in communication with said air chest at one end and in communication with the said exhaust manifold at the other end.

5. An internal combustion reciprocating piston engine comprising a cylinder head fixedly mounted on an engine block, said cylinder head having a plurality of aligned and evenly spaced combustion chambers, a first fuel injection for each said cylinder mounted in said cylinder head to inject fuel into a respective said combustion chamber, each said combustion chamber having a passageway leading to a respective cylinder mounted in said engine block, a piston slidably mounted in each said cylinder and caused to reciprocate in accordance with the engine cycle by a reciprocating linkage, said engine block having a valve port below each said combustion chamber, a second fuel injector for each said cylinder mounted in said engine block to inject fuel into an injection cup fixedly mounted in each said valve port, said injection cup comprising an outer cylinder and an inner cylinder, a plurality of webs between the inner and outer cylinder, a lip on the inner cylinder at an upper end and a deflector at a lower end, a thickened web having an injection port in communication with the inner volume of said inner cylinder, a poppet valve slidably mounted in said engine block to control the flow through said valve port, a camshaft rotatively mounted in said engine block for actuating said poppet valves in said valve ports, said camshaft having double-cycle cam lobes opening said poppet valve in said valve port at the beginning of the exhaust stroke of said piston bringing said combustion chamber into communication with said valve port, said valve port in communication with a nozzle of an ejector, the exit of said nozzle in communication with an air chest, a diffuser inlet of said ejector opposite the nozzle exit, said diffuser inlet also in communication with said air chest and the exit of said diffuser is in communication with an exhaust manifold, said double-cycle cam lobe of said camshaft allowing said poppet valve to close at the end of the intake stroke of said piston.

6. The engine as set forth in claim 5 wherein said engine comprises a second ejector for each said cylinder, said second ejector having a nozzle fixedly mounted on said cylinder, the volume of said cylinder brought into communication with said nozzle of said second ejectors when the reciprocation of said piston in said cylinder uncovers said nozzle of said second ejector at a point corresponding to the time when the double-cycle cam lobe begins to open said poppet valve, the exit of said nozzle of said second ejector also in communication with said air chest, a diffuser of said second ejector opposite the nozzle of said second ejector, said diffuser of said second ejector in communication with said air chest at one end and in communication with the said exhaust manifold at the other end.

* * * * *